(12) United States Patent
Park et al.

(10) Patent No.: US 8,713,469 B2
(45) Date of Patent: Apr. 29, 2014

(54) TERMINAL AND METHOD OF CONTROLLING THE SAME

(75) Inventors: Jae Pil Park, Seoul (KR); Byoung Pyo Moon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 789 days.

(21) Appl. No.: 12/269,831

(22) Filed: Nov. 12, 2008

(65) Prior Publication Data

US 2009/0282360 A1 Nov. 12, 2009

(30) Foreign Application Priority Data

May 8, 2008 (KR) .................. 10-2008-0042812

(51) Int. Cl.
*G06F 3/048* (2013.01)
*G06F 3/041* (2006.01)

(52) U.S. Cl.
USPC .......................................... 715/783; 345/173

(58) Field of Classification Search
USPC .......... 715/784, 783, 786, 810, 830; 345/156, 345/173
See application file for complete search history.

(56) References Cited

U.S. PATENT DOCUMENTS

| | | | |
|---|---|---|---|
| 6,223,058 B1 | 4/2001 | Sudo et al. | |
| 6,292,188 B1* | 9/2001 | Carlson et al. | 715/854 |
| 6,690,391 B1* | 2/2004 | Proehl et al. | 715/720 |
| 6,910,191 B2* | 6/2005 | Segerberg et al. | 715/830 |
| 6,976,228 B2* | 12/2005 | Bernhardson | 715/830 |
| 7,293,241 B1* | 11/2007 | Tornqvist et al. | 715/767 |
| 7,669,126 B2* | 2/2010 | Morita et al. | 715/716 |
| 7,844,916 B2* | 11/2010 | Yamanaka et al. | 715/786 |
| 2004/0233239 A1 | 11/2004 | Lahdesmaki | |
| 2005/0149551 A1* | 7/2005 | Fong et al. | 707/102 |
| 2005/0257166 A1* | 11/2005 | Tu | 715/787 |
| 2005/0257169 A1* | 11/2005 | Tu | 715/810 |
| 2006/0123359 A1* | 6/2006 | Schatzberger | 715/810 |
| 2007/0250786 A1* | 10/2007 | Jeon et al. | 715/765 |
| 2008/0120572 A1* | 5/2008 | Bahn et al. | 715/810 |
| 2011/0010667 A1* | 1/2011 | Sakai et al. | 715/810 |

FOREIGN PATENT DOCUMENTS

| | | |
|---|---|---|
| EP | 1536616 | 6/2005 |
| RU | 2266561 | 12/2005 |
| RU | 2280334 | 7/2006 |
| RU | 2371782 | 10/2009 |
| WO | 03/079686 | 9/2003 |
| WO | 2007/076226 | 7/2007 |
| WO | 2008/025473 | 3/2008 |
| WO | 2008025472 | 3/2008 |

OTHER PUBLICATIONS

In the European Patent Office Application Serial No. 09159191.7, Search Report dated Oct. 29, 2012, 9 pages.

* cited by examiner

*Primary Examiner* — Rashawn Tillery
(74) *Attorney, Agent, or Firm* — Lee, Hong, Degerman, Kang & Waimey

(57) ABSTRACT

A terminal and method of controlling the same are presented. The terminal includes a touchscreen for displaying a list of items and a controller for controlling a scroll of a first list of items in a first direction and a scroll of a second list of items in a second direction, wherein the second list of items is related to an item selected from the first list of items, wherein the second list of items is scrolled in the second direction while the first list of items is displayed.

20 Claims, 18 Drawing Sheets

FIG. 17
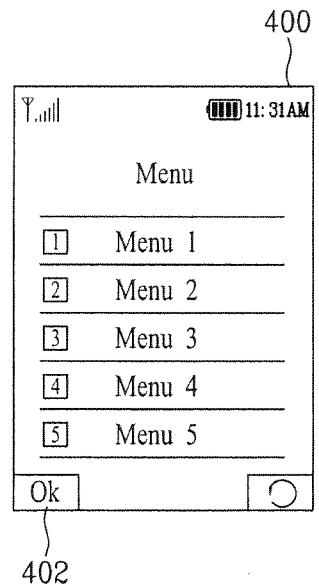
(17-1)
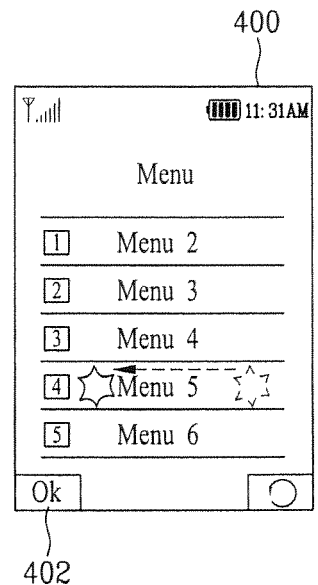
(17-2)
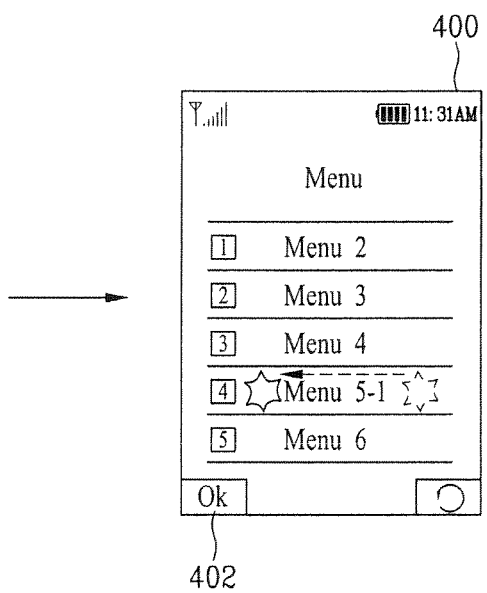
(17-3)
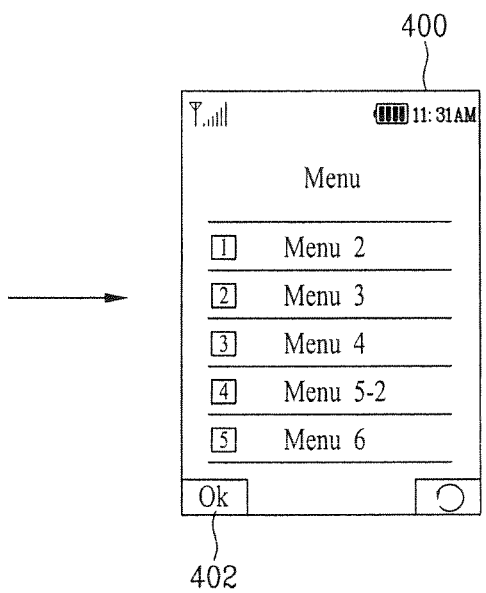
(17-4)

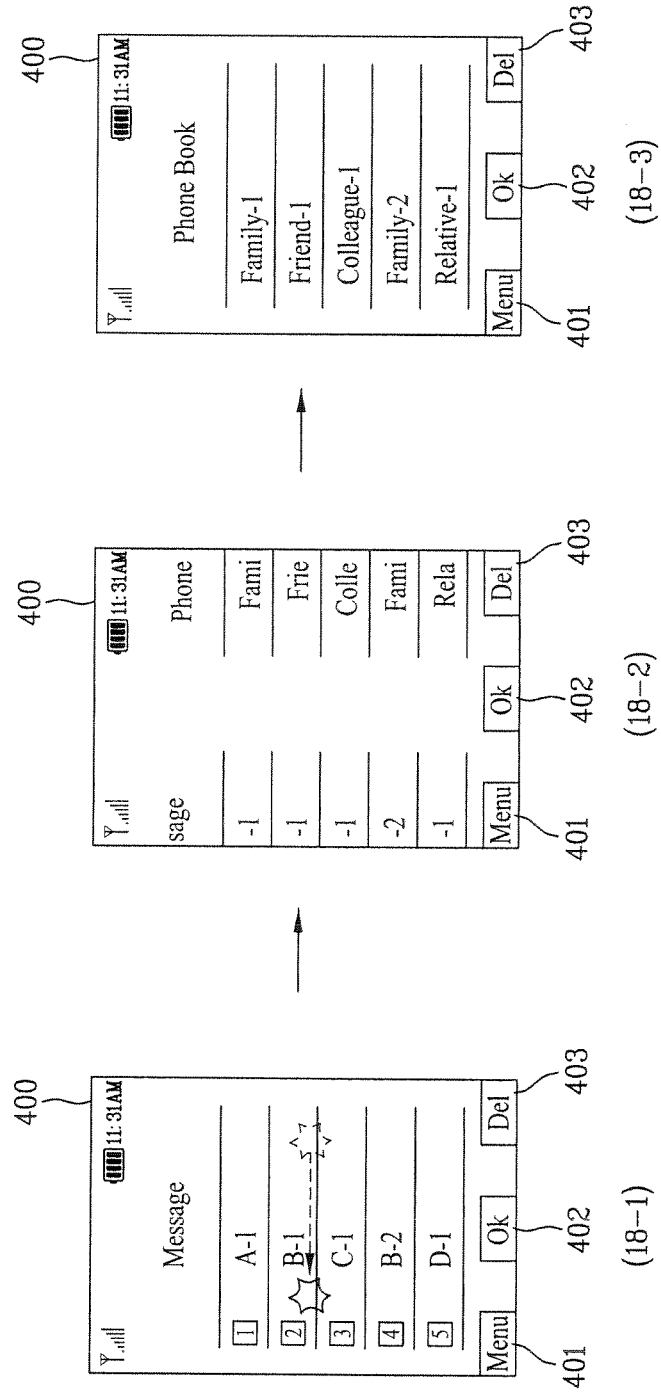

TERMINAL AND METHOD OF CONTROLLING THE SAME

This application claims the benefit of the Korean Patent Application No. 10-2008-0042812 filed on May 8, 2008 which is hereby incorporated by reference as if fully set forth herein.

BACKGROUND OF THE INVENTION

1. Field of the Invention

The present invention relates to a terminal, and more specifically, to a terminal and method of controlling the same.

2. Discussion of the Related Art

A mobile terminal may be configured to perform various functions. Examples of such functions include data and voice communications, capturing images and video via a camera, recording audio, outputting music via a speaker system, and displaying images and video. Some terminals include additional functionality which supports game playing, while other terminals are also configured as multimedia players. More recently, mobile terminals have been configured to receive broadcast and multicast signals which permit viewing content, such as videos and television programs.

Generally, terminals may be classified into mobile terminals and stationary terminals. Mobile terminals may be further classified into handheld terminals and vehicle mounted terminals.

Various menus exist on a terminal for performing the above-mentioned functions. However, the various menus may be confusing or difficult to navigate. Therefore, efforts have been made to develop menu configurations that facilitate better menu navigation.

SUMMARY OF THE INVENTION

Accordingly, the present invention is directed to a terminal and method of controlling the same that substantially obviate one or more problems due to limitations and disadvantages of the related art.

In one embodiment a terminal is presented. The terminal includes a touchscreen for displaying a list of items and a controller for controlling a scroll of a first list of items in a first direction and a scroll of a second list of items in a second direction, wherein the second list of items is related to an item selected from the first list of items, wherein the second list of items is scrolled in the second direction while the first list of items is displayed.

According to one feature the first direction may be vertical and the second direction may be horizontal. Alternatively, the first direction may be horizontal and the second direction may be vertical.

In another feature, the controller further controls displaying a number of items comprising the second list of items adjacent to the item selected from the first list of items. Additionally, the controller further controls replacing the item selected from the first list of items with a first item selected from the second list of items. Moreover, the controller further controls replacing the first item selected from the second list with a second item from the second list of items if the first item selected from the second list is currently displayed on the first list of items.

In yet another feature, a plurality of items are selected from the first list of items and a list associated with each of the plurality of items is scrolled in a second direction. Additionally, the controller further controls displaying a plurality of first lists on the touchscreen.

In still yet another feature, each of the plurality of first lists is scrolled independently. Additionally, the controller further controls displaying a menu associated with the second list if the scroll is performed on the final item of the second list of items. Finally, the second item may be from a list of items separate from the first list of items.

In a second embodiment of the present invention, a terminal is presented. The terminal includes a touchscreen for displaying a list of items and a controller for selecting a first item and displaying first information related to the selected first item, wherein the controller controls a scroll to second information related to a second item in a first direction and a scroll to item information related to an item having displayed information in a second direction.

In another embodiment, a method of controlling a scroll is presented. The method includes displaying a list of items and controlling a scroll of a first list of items in a first direction and a scroll of a second list of items in a second direction, wherein the second list of items is related to an item selected from the first list of items, wherein the second list of items is scrolled in the second direction while the first list of items is displayed.

In yet another embodiment, a method of controlling a scroll is presented, the method includes displaying a list of items, selecting a first item and displaying first information related to the selected first item, and controlling a scroll of second information related to a second item in a first direction or a scroll to item information related to an item having displayed information in a second direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 15 to 17 illustrate a display screen for controlling a mobile terminal according to a ninth embodiment of the present invention.

FIG. 18 illustrates a display screen for controlling a mobile terminal according to a tenth embodiment of the present invention.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

As used herein, the terms 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Figure 1:
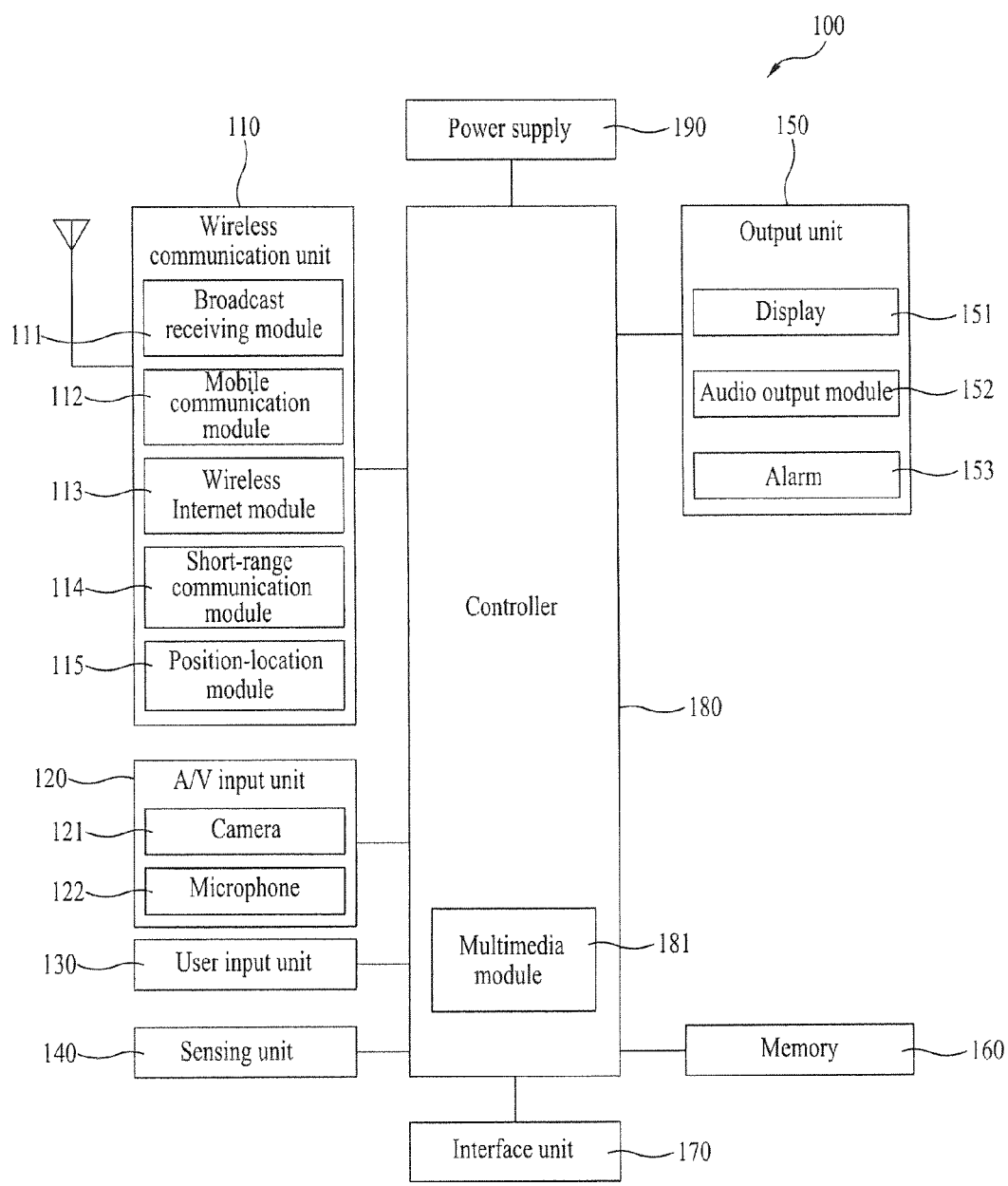
FIG. 1 illustrates a block diagram of a mobile terminal in accordance with an embodiment of the present invention.

FIG. 1 is a block diagram of terminal 100 in accordance with an embodiment of the present invention. The terminal 100 may be implemented as a variety of terminal types. Examples of such terminals include mobile phones, user equipment, smart phones, computers, digital broadcast terminals, personal digital assistants, portable multimedia players (PMP), and navigators.

By way of non-limiting example only and for convenience and conciseness of the following description, the present invention is illustrated as a mobile phone. It is not intended to limit the scope of the present invention. The teachings of the present invention apply equally to other types of terminals.

FIG. 1 shows the terminal 100 having various components, but it is understood that implementing all of the illustrated components is not a requirement. Greater or fewer components may alternatively be implemented.

FIG. 1 shows the terminal 100 having a wireless communication unit 110 configured with various components. The broadcast receiving module ill receives a broadcast signal and broadcast associated information from an external broadcast managing entity via a broadcast channel.

The broadcast channel may include a satellite channel or a terrestrial channel. The broadcast managing entity may be a system which transmits a broadcast signal or broadcast associated information.

Examples of broadcast associated information include information associated with a broadcast channel, a broadcast program, or a broadcast service provider. For example, broadcast associated information may include an electronic program guide (EPG) of digital multimedia broadcasting (DMB) or electronic service guide (ESG) of digital video broadcast-handheld (DVB-H).

The broadcast receiving module 111 may receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T).

The broadcast receiving module 111 may also receive multicast signals. Data received by the broadcast receiving module 111 may be stored in a suitable device, such as the memory 160.

The mobile communication module 112 transmits and receives wireless signals to and from one or more network entities, such as a base station or a Node-B. The wireless signals may represent audio, video, multimedia, control signaling, or data.

The wireless Internet module 113 provides Internet access for the terminal 100. The wireless Internet module 113 may be internally or externally coupled to the terminal 100.

The short-range communication module 114 facilitates short-range communications. Suitable technologies for implementing the short-range communications module 114 include radio frequency identification (RFID), infrared data association (IrDA), ultra-wideband (UWB), as well at the networking technologies commonly referred to as Bluetooth™ and ZigBee™.

The position-location module 115 identifies and obtains the location of the terminal 100. The position-location module 115 may be implemented using global positioning system (GPS) components which cooperate with associated satellites and network components.

The audio/video (A/V) input unit 120 provides audio or video signal inputs to the terminal 100. The A/V input unit 120 may include a camera 121 and a microphone 122. The camera receives and processes image frames of still pictures or video.

The microphone 122 receives an external audio signal while the terminal 100 is in a particular mode, such as a phone call mode, a recording mode, or a voice recognition mode. The audio signal is processed and converted into digital data. The terminal 100 and A/V input unit 120 may include assorted noise removing algorithms to remove noise generated in the course of receiving the external audio signal.

Data generated by the A/V input unit 120 may be stored in the memory 160, utilized by the output unit 150, or transmitted via one or more modules of communication unit 110. The terminal 100 may include two or more microphones 122 or cameras 121.

The user input unit 130 generates input data in response to user manipulation of an associated input device or devices. Examples of such devices include a keypad, a dome switch, a touchpad, a jog wheel, and a jog switch.

The sensing unit 140 provides status measurements for various aspects of the terminal 100. For example, the sensing unit may detect an open and close state of the terminal 100, relative positioning of components of the terminal, a change of position of the terminal, a change of position of a component of the terminal, a presence or absence of user contact with the terminal, orientation of the terminal, or acceleration or deceleration of the terminal. The sensing unit 140 may also sense the presence or absence of power provided by the power supply 190 and the presence or absence of a connection between the interface unit 170 and an external device.

The interface unit 170 may be implemented to connect the terminal with an external device. External devices include wired and wireless headphones, external chargers, power supplies, storage devices configured to store data, or microphones. The interface unit 170 may be configured using a wired and wireless data port, a memory card socket, audio input and output ports (I/O), or video I/O ports.

The interface unit 170 may act as a passage for supplying the mobile terminal 100 with a power from the cradle or delivering various command signals input from the cradle if the mobile terminal 110 is connected to an external cradle. Each of the various command signals input from the cradle or the power may operate as a signal enabling the mobile terminal 100 to recognize that it is correctly loaded in the cradle.

The output unit 150 outputs information associated with the terminal 100. The display 151 is typically implemented to display information associated with the terminal 100. For example, the display 151 may provide a graphical user interface which includes information associated with a phone call if the terminal is operating in a phone call mode. The display 151 may display images which are associated with various modes, such as a video call mode or a photographing mode.

The display 151 may be configured as a touch screen working in cooperation with the input unit 130, in one embodiment of the present invention. This configuration allows the display 151 to function both as an output device and an input device.

The display 151 may be implemented using known display technologies such as a liquid crystal display (LCD), a thin film transistor-liquid crystal display (TFT-LCD), an organic light-emitting diode display (OLED), a flexible display, or a three-dimensional display. The terminal 100 may include one or more displays 151. An example of a two-display embodiment is one in which one display 151 is configured as an internal display which is viewable when the terminal 100 is in an opened position and a second display configured as an external display which is viewable in both the open and closed positions.

The touchscreen can be configured to detect a touch input pressure as well as a touch input position and size.

Meanwhile, a proximity sensor (not shown) may be provided within or around the touchscreen. The proximity sensor detects an object approaching a prescribed detecting surface or a presence or non-presence of an object existing around itself using an electromagnetic power or infrared rays without mechanical contact.

Example of the operational principle of the proximity sensor are explained as follows. First, an oscillation amplitude of the oscillation circuit attenuates or stops if an object approaches a sensor detecting surface while an oscillation circuit oscillates a sine radio frequency. This change is converted to an electric signal to detect a presence or non-presence of the object. Therefore, a proximity switch may detect any non-metallic object without interference.

Additionally, an electrostatic may be configured to detect the proximity of a pointer via an electric field change attributed to the proximity of the pointer.

The sensor may detect a position of the pointer and a distance between the pointer and the touchscreen if the pointer is placed in the vicinity of the touchscreen without being actually contacted with the touchscreen. For clarity and convenience of explanation, an action for enabling the pointer approaching the touchscreen to be recognized as placed on the touchscreen is referred to as a 'proximity touch' and an action of enabling the pointer to actually come into contact with the touchscreen is referred to as a 'contact touch'. Additionally, a position at which the proximity touch is made to the touchscreen using the pointer is referred to as the position of the pointer vertically corresponding to the touchscreen when the pointer makes the proximity touch.

FIG. 1 further shows the output unit 150 having an audio output module 152. The audio output module 152 may be implemented using one or more speakers, buzzers, or other audio producing devices.

The audio output module 152 functions in various modes including a call-receiving mode, a call-placing mode, a recording mode, a voice recognition mode, or a broadcast reception mode. The audio output module 152 outputs audio relating to a particular function, such as a call notification, a message notification, or a error notification.

The output unit 150 is further shown having a vibration module 153, which may be used to identify the occurrence of an event associated with the terminal 100. An example an output of vibration module 153 includes a vibration as a notification to a user.

The vibration module 153 may vibrate when the terminal 100 receives a call or message. Vibration may also be provided by the vibration module 153 in response to receiving user input at the terminal 100, thereby providing a tactile feedback mechanism. It is understood that the various outputs provided by the components of output unit 150 may be performed separately or performed using any combination of the components.

The memory 160 may store various types of data to support the processing, control, or storage requirements of the terminal 100. Examples of such data include program instructions for applications operating on the terminal, contact data, phonebook data, messages, pictures, or video.

The memory 160 shown in FIG. 1 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 controls the overall operations of the terminal 100. For example, the controller 180 performs the control and processing associated with voice calls, data communications, video calls, camera operations, and recording operations.

The controller 180 may include a multimedia module 181 which provides multimedia playback. The multimedia module 181 may be configured as part of the controller 180 or may be implemented as a separate component.

Moreover, the controller 180 is able to perform a pattern recognizing process for recognizing a writing input and a picture drawing input carried out on the touchscreen as characters or images.

The power supply 190 provides power to the various components of the terminal 100. The power provided may be internal power or external power.

Various embodiments described herein may be implemented in a computer-readable medium using computer software. The various embodiments may also be implemented in hardware.

A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by controller 180.

A software implementation of the embodiments described herein may be implemented with separate software modules, such as procedures and functions, each of which perform one or more of the functions and operations described herein. The software code may be implemented with a software application written in any suitable programming language and may be stored in the memory 160 for execution by the controller 180 or a processor.

The terminal 100 may be implemented in a variety of different configurations. Examples of such configurations include folder-type, slide-type, bar-type, rotational-type, and swing-type.

Figure 2:
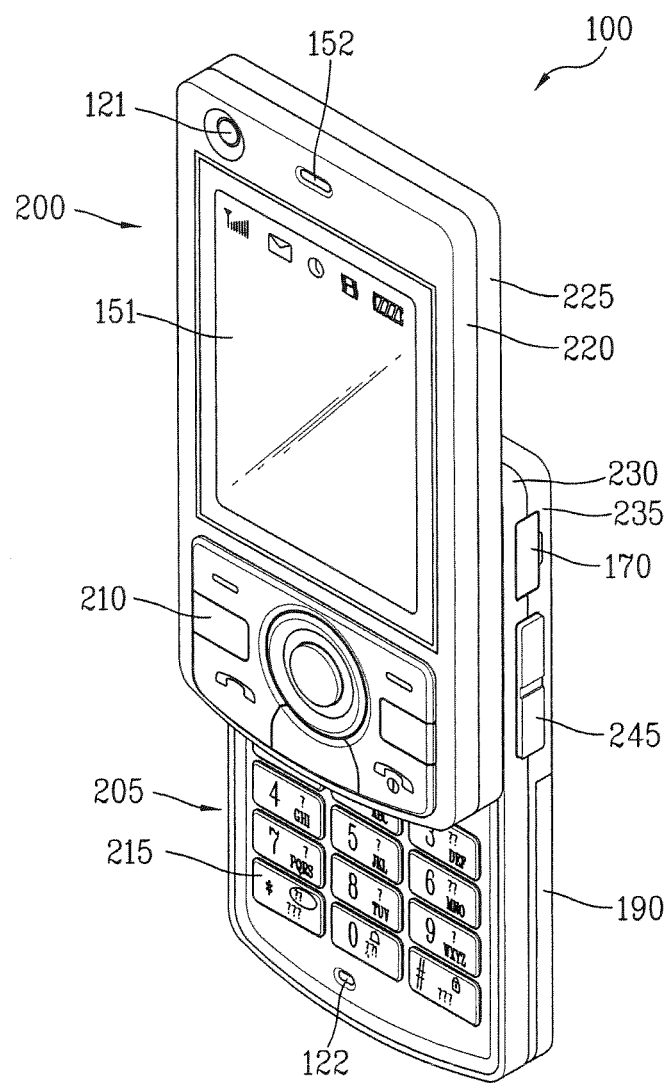
FIG. 2 illustrates a perspective view of a front side of a mobile terminal according to an embodiment of the present invention.

For clarity, further disclosure will primarily relate to a slide-type terminal 100. However such teachings apply equally to other types of terminals 100. FIG. 2 is a perspective view of a front side of a terminal 100 according to an embodiment of the present invention. As shown in FIG. 2, the terminal 100 is shown having a first body 200 configured to slideably cooperate with a second body 205.

The first body 200 slides relative to second body 205 between open and closed positions. The first body 200 is positioned over the second body 250 in the closed position such that the keypad 215 is substantially or completely obscured by the first body 200. The user may access the keypad 215, the display 151, and function keys 210 in the open position. The function keys 210 may be configured for a user to enter commands such as start, stop, or scroll.

The user input unit 130 is implemented using the function keys 210 and keypad 215. The function keys 210 are associated with the first body 200 and the keypad 215 is associated with the second body 205. The keypad 215 includes various keys such as numbers, characters, and symbols, to enable a user to place a call, prepare a text or multimedia message, and operate the terminal.

The terminal 100 is operable in either a standby mode or an active call mode. Typically, the terminal 100 functions in the standby mode when in the closed position and in the active mode when in the open position. The mode configuration may be changed as required or desired by the user.

The first body 200 is shown formed from a first case 220 and a second case 225 and the second body 205 is shown formed from a first case 230 and a second case 235. The respective first 220, 230 and second 225, 235 cases may be formed from a suitably ridge material such, as injection molded plastic, or formed using metallic material, such as stainless steel (STS) and titanium (Ti).

One or more intermediate cases may be provided between the first case 220 and second case 225 of the first body 200 or between the first case 230 and second case 235 of the second body 205. The first body 200 and the second body 205 may be sized to house electronic components necessary to support operation of the terminal 100.

The first body 200 is shown having a camera 121 and audio output module 152. The camera 121 may be selectively positioned such that it may rotate or swivel relative to the first body 200.

The function keys 210 are positioned adjacent to a lower side of the display 151. The display 151 is shown implemented as an LCD. The display 151 may also be configured as a touchscreen having an underlying touchpad which generates signals responsive to user contact with the touchscreen.

The second body 205 is shown having a microphone 122 positioned adjacent to the keypad 215 and side keys 245 positioned along the side. The side keys 245 may be configured as hot keys, such that the side keys are associated with a particular function of the terminal 100.

An interface unit 170 is shown positioned adjacent to the side keys 245. A power supply 190 in a form of a battery is located on a lower portion of the second body 205.

Figure 3:
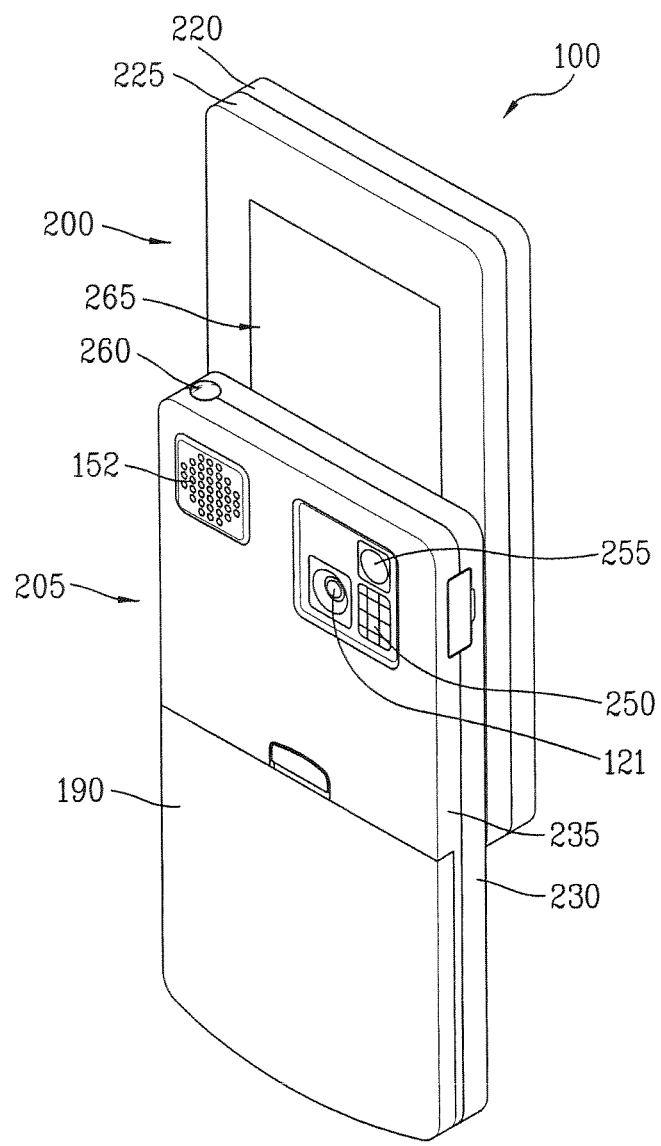
FIG. 3 illustrates a perspective view of a backside of the mobile terminal illustrated in FIG. 2.

FIG. 3 is a rear view of the terminal 100 shown in FIG. 2. As shown in FIG. 3, the second body 205 includes a camera 123, a flash 250, and a mirror 255.

The flash 250 operates in conjunction with the camera 123. The mirror 255 is useful for assisting a user to position the camera 123 in a self-portrait mode.

The camera 123 of the second body 205 faces a direction opposite to a direction faced by the camera 121 of the first body 200. The camera 121 of the first body 200 and camera 123 of the second body 205 may have the same or different capabilities.

In one embodiment, the camera 121 of the first body 200 operates with a relatively lower resolution than the camera 123 of the second body 205. Such an arrangement works well during a video conference in which reverse link bandwidth capabilities may be limited. The relatively higher resolution of the camera 123 of the second body 205 is useful for obtaining higher quality pictures.

The second body 205 also includes an audio output module 153 configured as a speaker which is located on an upper side of the second body. The audio output module 152 of the first body 200 and the audio output module 153 of second body 205 may cooperate to provide stereo output. Moreover, either or both of the audio output modules 152 and 153 may be configured to operate as a speakerphone.

A broadcast signal receiving antenna 260 is shown located at an upper end of the second body 205. The antenna 260 functions in cooperation with the broadcast receiving module 111. The antenna 260 may be fixed or configured to retract into the second body 205.

The rear side of the first body 200 includes a slide module 265. The slide module 265 which slideably couples with a corresponding slide module (not shown) located on the front side of the second body 205.

It is understood that the illustrated arrangement of the various components of the first body 200 and the second body 205 may be modified as desired. Some or all of the components of one body may alternatively be implemented on the other body. In addition, the location and relative positioning of the components are not critical to many embodiments and, therefore, the components may be positioned at locations which differ from those shown by the representative figures.

The terminal 100 may operate in a communication system capable of transmitting data via frames or packets. The communication system may include wired communication, wireless communication, or satellite-based communication system.

The communication system may utilize various systems such as frequency division multiple access (FDMA), time division multiple access (TDMA), code division multiple access (CDMA), universal mobile telecommunications system (UMTS), long term evolution (LTE) of the UMTS, or the global system for mobile communications (GSM). By way of non-limiting example, further description will relate to a CDMA communication system, but such teachings apply equally to other system types.

Figure 4:
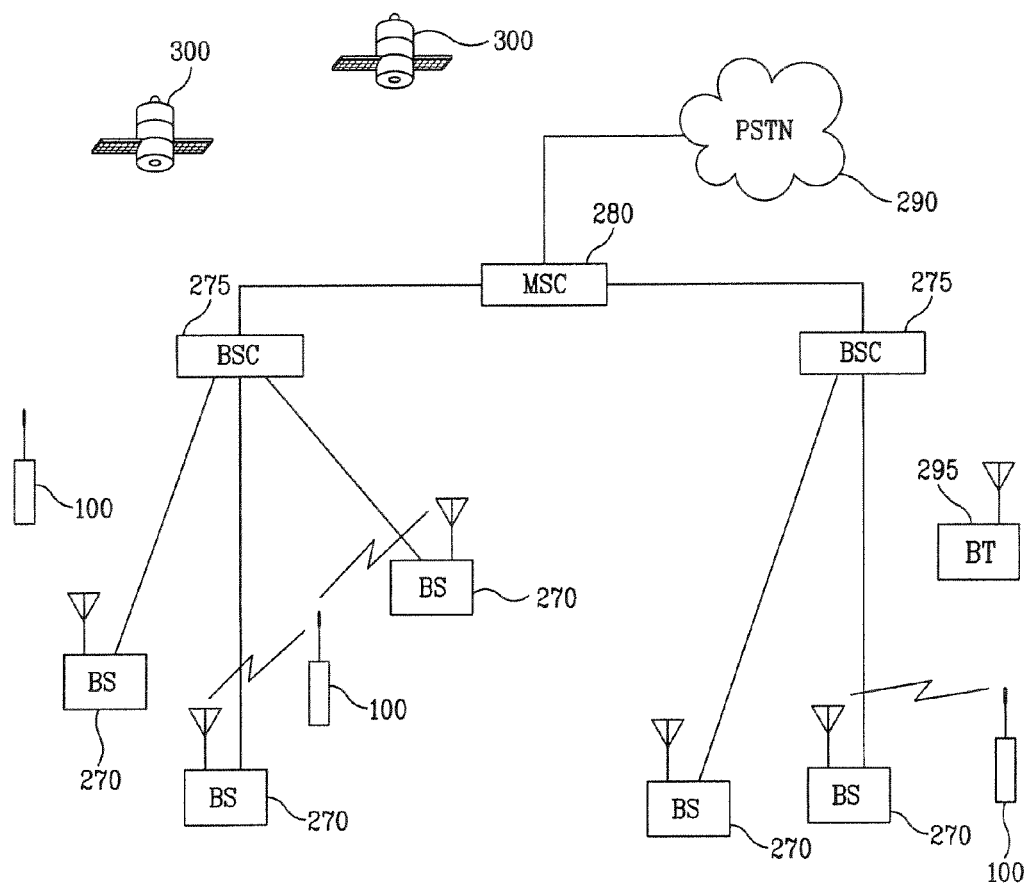
FIG. 4 illustrates a block diagram of a wireless communication system.

As shown in FIG. 4, a CDMA wireless communication system is shown having a plurality of terminals 100, a plurality of base stations (BS) 270, base station controllers (BSC) 275, and a mobile switching center (MSC) 280. The MSC 280 is configured to interface with a conventional public switch telephone network (PSTN) 290 and is also configured to interface with the BSCs 275.

The BSCs 275 are coupled to the BSs 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omnidirectional antenna or an antenna pointed in a particular direction radially away from the BS 270. Each sector may include two antennas for diversity reception. Each BS 270 may be configured to support a plurality of frequency assignments, with each frequency assignment having a particular spectrum.

The intersection of a sector and frequency assignment may be referred to as a CDMA channel. The BSs 270 may also be referred to as base station transceiver subsystems (BTSs). In an alternate embodiment, the term "base station" may be used to refer collectively to a BSC 275 and one or more BSs 270.

The BSs 270 may also be denoted "cell sites." Alternatively, individual sectors of a given BS 270 may be referred to as cell sites.

A broadcasting transmitter (BT) 295 is shown broadcasting to terminals 100 operating within the system. The broadcast receiving module 111 of the terminal 100 is configured to receive broadcast signals transmitted by the BT 295. Similar arrangements may be implemented for other types of broadcast and multicast signaling.

FIG. 4 also shows several global positioning system (GPS) satellites 300. The GPS satellites 300 facilitate locating the position of some or all of the terminals 100. The position-location module 115 of the terminal 100 is typically configured to cooperate with the satellites 300 to obtain position information.

Other types of position detection technology may be used in addition to or instead of GPS location technology. Some or all of the GPS satellites 300 may alternatively or additionally be configured to provide satellite DMB transmissions.

The BSs 270 receive sets of reverse-link signals from various terminals 100 during operation of the wireless communication system. The terminals 100 are performing calls, messaging, or other communications.

Each reverse-link signal received by a BS 270 is processed within that BS. The resulting data is forwarded to an associated BSC 275.

The BSC 275 provides call resource allocation and mobility management functionality including soft handoffs between base stations 270. The ESCs 275 also route the received data to the MSC 280, which provides additional routing services for interfacing with the PSTN 290. Similarly, the PSTN interfaces with the MSC 280 and the MSC interfaces with the BSC 275, which in turn control the BSs 270 to transmit sets of forward-link signals to the terminals 100.

Figure 5:
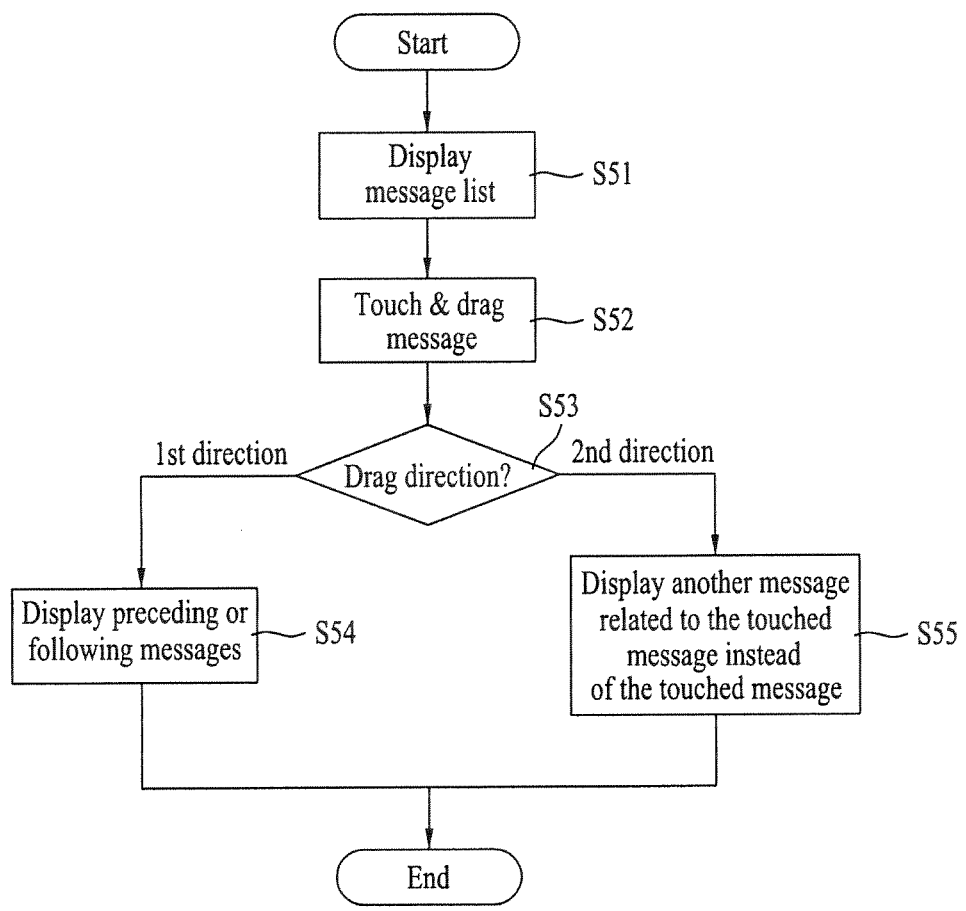
FIG. 5 illustrates a flowchart for a method of controlling a mobile terminal according to a first embodiment of the present invention.

In the following description, steps of a broadcast controlling method of a terminal 100 according to the present invention are explained one-by-one with reference to FIG. 5 as follows. FIG. 5 is a flowchart for a broadcast information reception method of a terminal according to a first embodiment of the present invention. Hereinafter, a display screen of the touchscreen 151 shall be indicated by a reference number 400.

A method of controlling a mobile terminal according to a first embodiment of the present invention is explained with reference to FIGS. 5 to 7 as follows.

FIG. 5 illustrates a flowchart for a method of controlling a mobile terminal according to a first embodiment of the present invention.

As illustrated in FIG. 5, a list of messages is displayed on a display (S51). A user may touch and drag the list of messages (S52). If the list is dragged in a first direction, a preceding or following message may be displayed (S53, S54). If the list is dragged in a second direction a message related to the selected message may be displayed (S53, S55).

Figure 6:
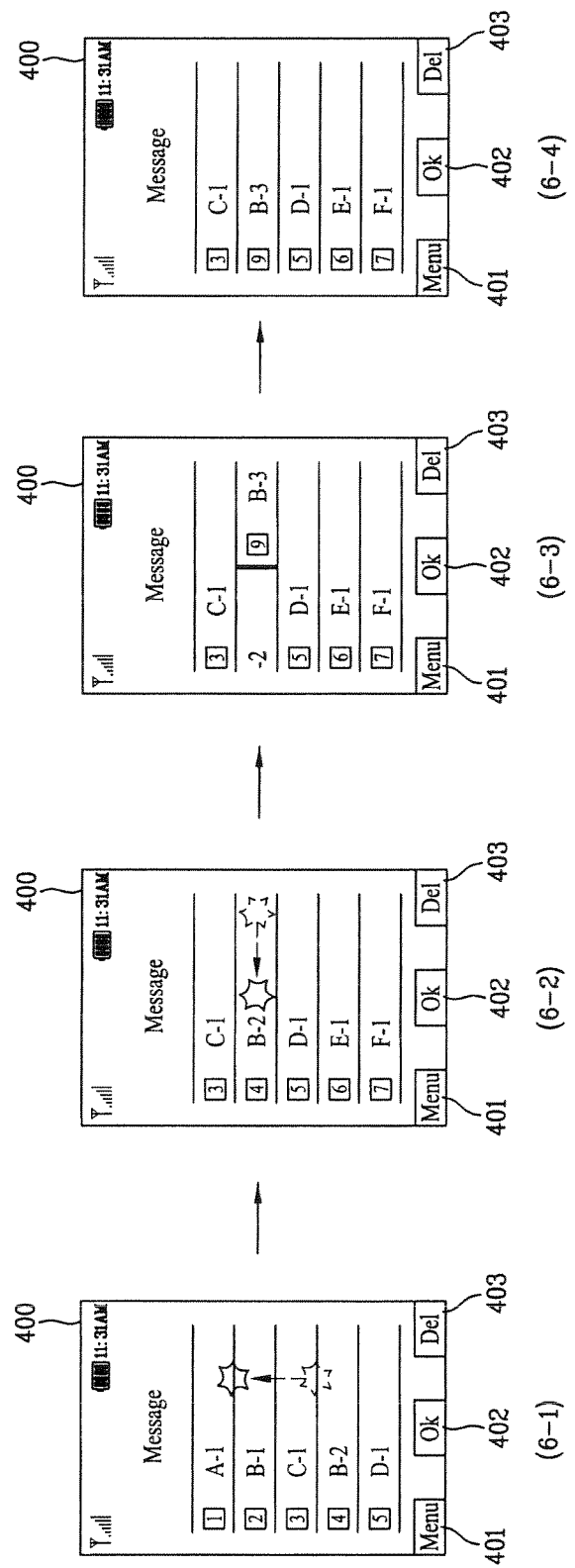
FIG. 6 and FIG. 7 illustrate a display screen for controlling a mobile terminal according to a first embodiment of the present invention.
Figure 7:
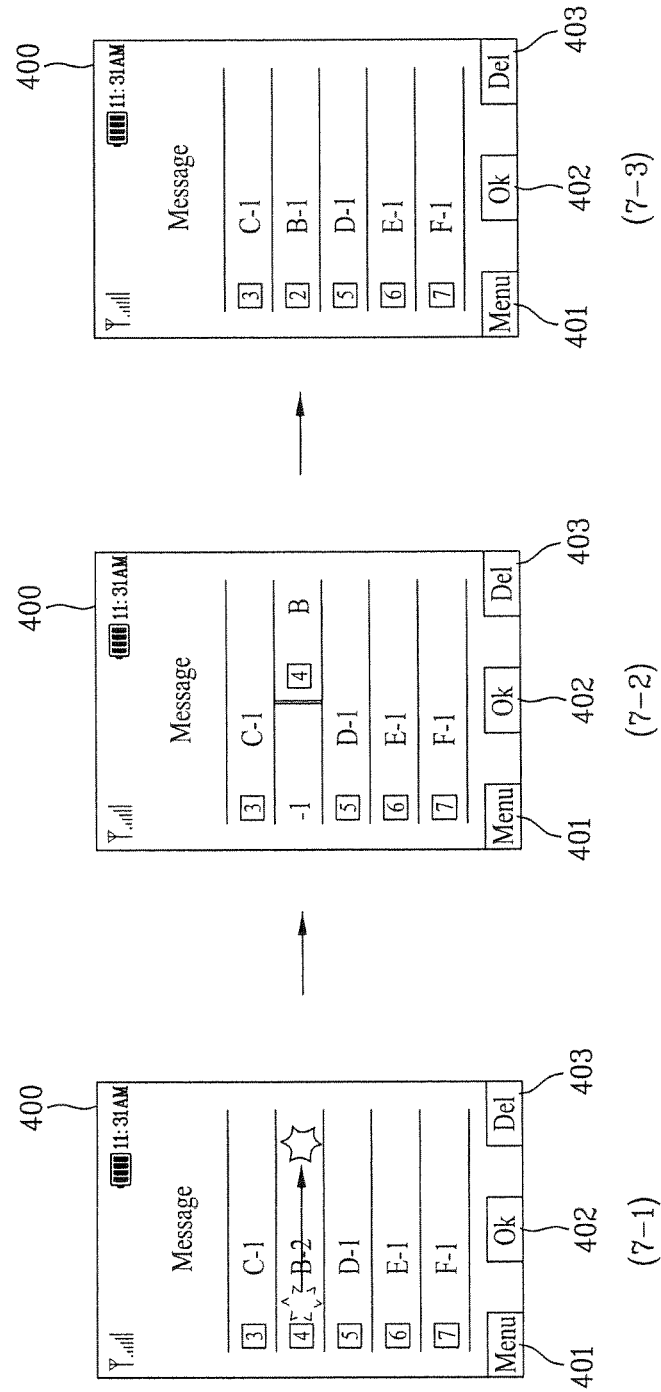

FIGS. 6 and 7 illustrate diagrams of a display screen for controlling a mobile terminal according to a first embodiment of the present invention.

As illustrated in FIG. 6-1, a list of received or transmitted messages may be displayed on the touchscreen 400 (S51). Specifically, the messages may be sorted in top-to-bottom direction in relation to a reception or transmission time.

A corresponding message or information, such as a name or phone number, of a recipient or sender may be indicated for each item on the list. As illustrated in FIG. 6, the sender of the corresponding message may be displayed as letter from the alphabet. Additionally, a numeral may be added adjacent to the letter in order to distinguish a plurality of messages from a single sender.

A user may touch and drag the list of messages on the touchscreen 400 in a first direction, such as bottom-to-top (S52, S53), as shown in FIG. 6-1.

In one example, as the messages are scrolled from bottom to top a size of the scrolled messages may be set proportional to a length of the touch and drag.

As illustrated in FIG. 6-2, a message B-2 may be touched and dragged in a second direction, such as right-to-left. The second direction is different from the first direction (S52, S53).

As illustrated in FIG. 6-3 and 6-4, as the selected message B-2 slides from right to left, another message B-3 may appear (S55). In this example, the message B-3 is related to the selected message B-2. For example, the message B-3, may be a message which had been sent by the sender B after the message B-2 was sent.

The related messages B-2, B-3, may construct a list which is different from the former list.

Additionally, message B-2 may be touched and then dragged in a direction opposite to the second direction, such as left-to-right. This is explained with reference to FIG. 7 as follows.

As illustrated in FIG. 7-1, message B-2 is touched and then dragged left to right. Furthermore, as illustrated in FIGS. 7-1 and 7-2 as message B-2 slides left to right, another message B-1 appears (S55). In this example, the message B-1 is a message which may have been sent by the sender B after the selected message B-2 was sent.

In the description above description if a message is touched and dragged in a direction, another message related to the selected message is displayed by replacing the selected message. Still, before the message is touched and dragged in a direction, a terminal may display a message related to the selected message before the touch and drag is performed.

Figure 8A:
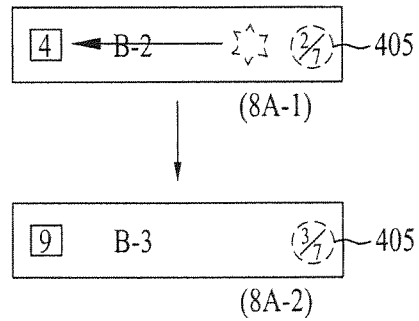
FIGS. 8A to 8C illustrate a display screen for controlling a mobile terminal according to a second embodiment of the present invention is implemented.
Figure 8B:
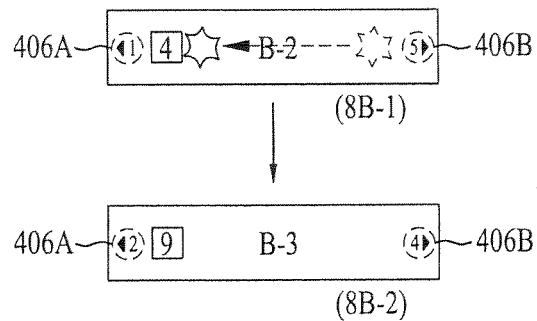
Figure 8C:
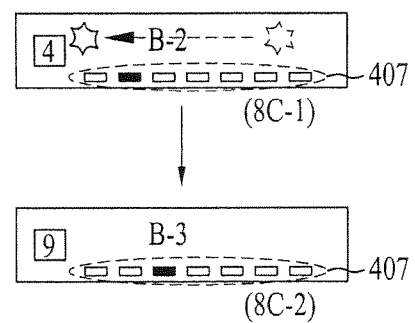

FIGS. 8A to 8C illustrate diagrams of a display screen for controlling a mobile terminal according to a second embodiment of the present invention. For clarity and convenience of the following description a single message in a message list is exemplarily displayed in FIGS. 8A to 8C.

As illustrated in FIG. 8A-1, a specific message B-2 may be displayed on the touchscreen. Additionally, information on messages 405 related to the selected message may be displayed adjacent to the selected message B-2.

As illustrated in FIG. 8A, the information 405 indicates that there are seven messages related to the selected message B-2, including the selected message B-2. Additionally, the information 405 also indicates that the selected message B-2 is the second message of the seven messages.

In one example, the message B-2 illustrated in FIG. 8A-1 may be touched and dragged right to left. Another message B-3 related to the selected message B-2 may be displayed instead of the selected message B-2 after the touch and drag. Information 405 on messages related to the message B-3 is represented within the message B-3. In this example, the information 405 indicates that seven messages are related to the message B-3, including the message B-3. Additionally, the information 405 also indicates that the message B-3 corresponds to a third message of the seven messages.

As illustrated in FIG. 8B-1, a selected message B-2 is displayed on the touchscreen. Information on messages related to the selected message B-2 is displayed within the selected message B-2. In this example, the information includes a first information 406A and a second information 406B.

The first information 406A indicates how many messages exist on the left side of the selected message B-2, for example, as illustrated in FIG. 8B-1, 1 message exists to the left of B-2. The second information 406B indicates how many messages exist on the right side of the selected message B-2. For example, as illustrated in FIG. 8B-1, 5 messages exist to the right of B-2.

If the selected message B-2 is touched and dragged right to left. A second message B-3 related to the selected message B-2 is displayed. The first information 406A and second information 406B may be represented within the displayed message B-3. In this example, the first information 406A indicates that 2 messages exist to the left of B-3. Additionally, the second information 406B indicates that 4 messages exist to the right of B-3.

As illustrated in FIG. 8C-1, a selected message B-2 may be displayed on the touchscreen. Information 405 on messages related to the specific message B-2 is represented as a bar within the selected message B-2.

The bar 407 includes scale marks corresponding to the selected message B-2 and the related messages, such as B-1, B-3, B-4, respectively. A terminal user may understand how many related messages exist in relation to the selected message B-2 by visually distinguishing the scale mark corresponding to the selected message B-2 from the other scale marks within the bar 407.

As illustrated in FIG. 8C-1 the selected message B-2 may be touched and dragged right to left. Another message B-3 related to the selected message B-2 then replaces the previously displayed message B-2. A terminal user may understand how may related messages exist in relation to the selected message B-3 by visually distinguishing the scale mark corresponding to the selected message B-3 from the other scale marks within the bar 407.

A method of controlling a mobile terminal according to a third embodiment of the present invention is explained with reference to FIG. 9 as follows.

Figure 9:
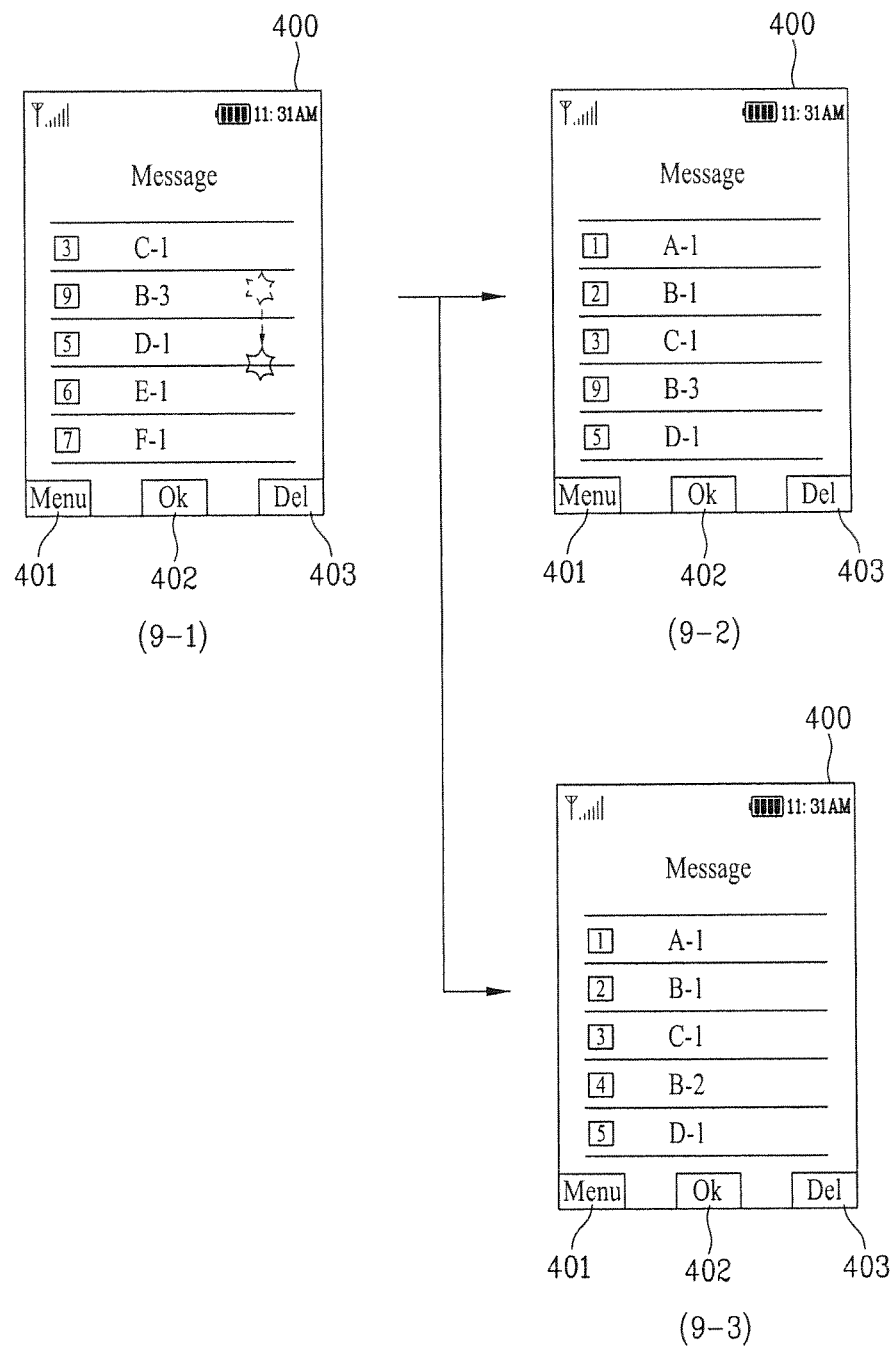
FIG. 9 illustrates a display screen for controlling a mobile terminal according to a third embodiment of the present invention.

FIG. 9 illustrates a diagram of a display screen for controlling a mobile terminal according to the third embodiment of the present invention is implemented.

As illustrated in FIG. 9-1, a selected message B-2 in the list has been replaced by a related message B-3. The related message B-3 is currently displayed. A touch and drag is then performed on the touchscreen 400 from top to bottom. As such, the messages in the list are scrolled down. The messages in the list may be scrolled in one of the following two methods.

As illustrated in FIG. 9-2, the messages of the list may be scrolled while the message B-3 is maintained. Additionally, the messages of the list may be scrolled after the message B-3 has been replaced by the previous message B-2 (FIG. 9-3).

A method of controlling a mobile terminal according to a fourth embodiment of the present invention is explained with reference to FIG. 10 as follows.

Figure 10:
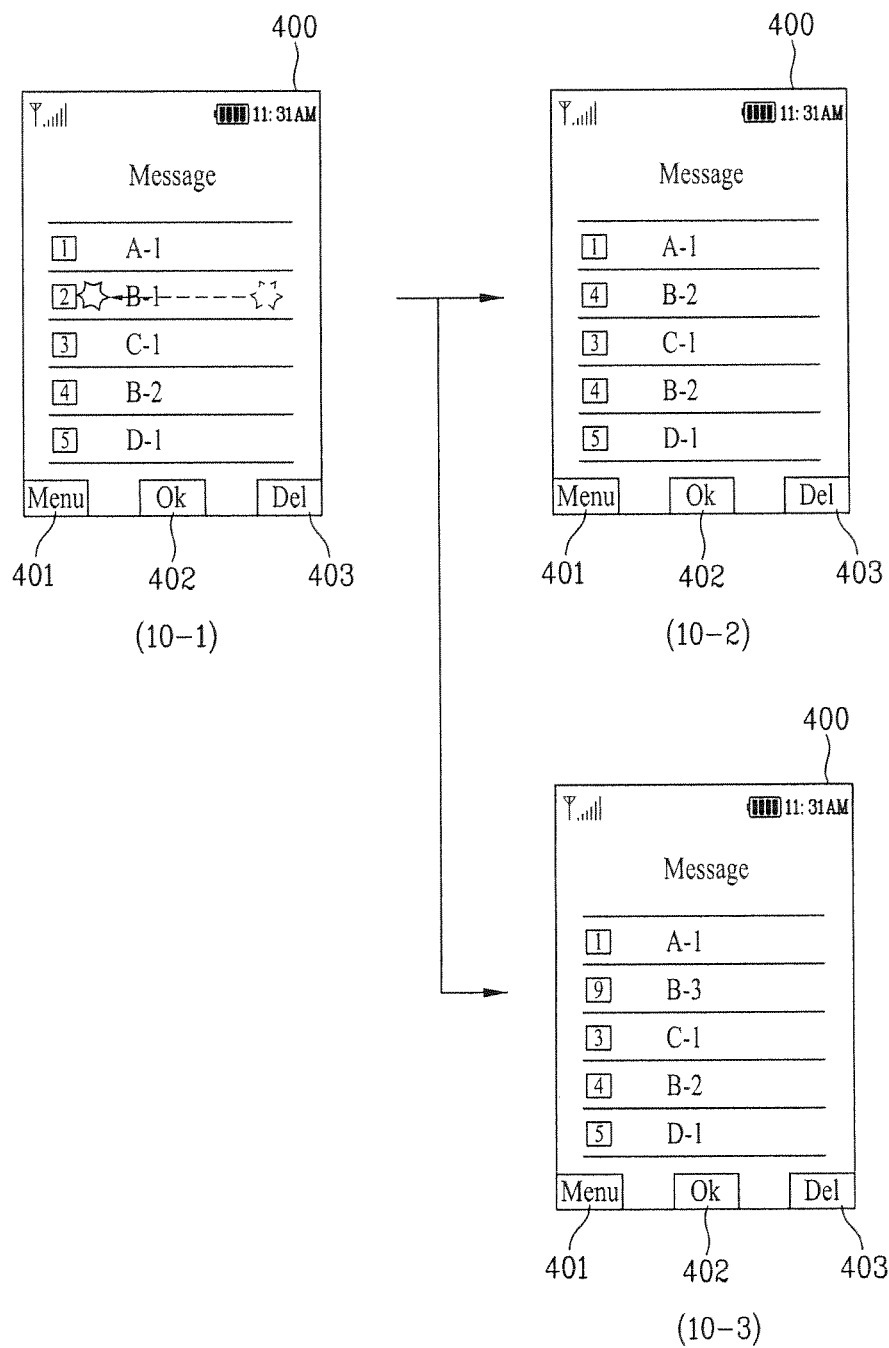
FIG. 10 illustrates a display screen for controlling a mobile terminal according to a fourth embodiment of the present invention.

FIG. 10 illustrates a display screen for controlling a mobile terminal according to a fourth embodiment of the present invention.

As illustrated in FIG. 10-1, a list of messages is displayed on the touchscreen 400. A message B-1 of the messages is touched and dragged right to left. Accordingly, as described in the foregoing description, another message related to the specific message B-1 replaces the message B-1.

The displayed message may be displayed in one of the following two methods.

As illustrated in FIG. 10-2, the most recent message B-2 may be displayed instead of the specific message B-1. However, in this example, the most related message B-2 is already displayed on the list. Therefore, in the interest of conserving space on the display, the mobile terminal may chose not to simultaneously display two of the same messages on the touchscreen 400.

As illustrated in FIG. 10-3, if the most recent message B-2 is already displayed on the list prior to the touch and drag, the second most recent message B-3 may be displayed by replacing the selected message B-1.

A method of controlling a mobile terminal according to a fifth embodiment of the present invention is explained with reference to FIG. 11 as follows.

Figure 11:
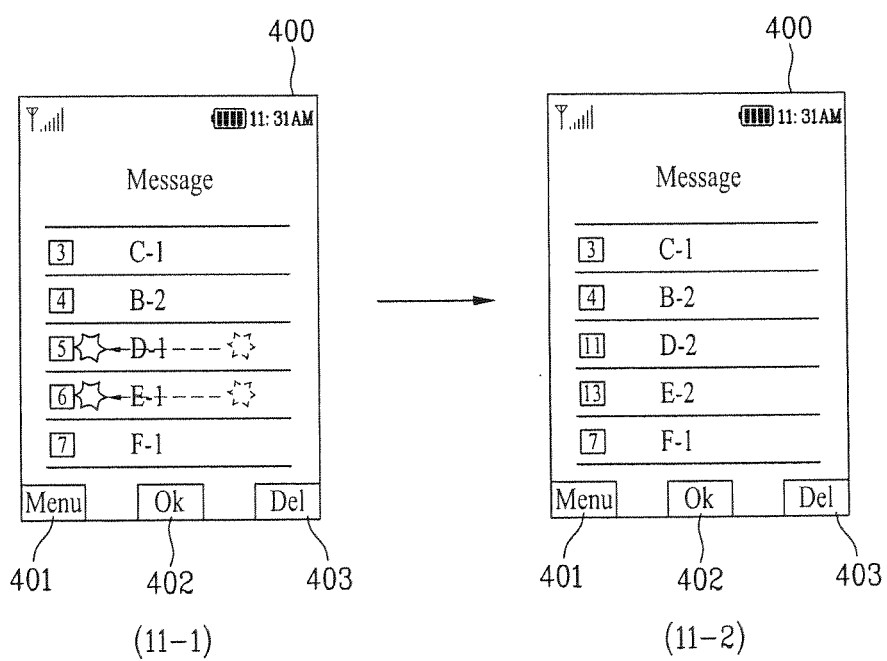
FIG. 11 illustrates a display screen for controlling a mobile terminal according to a fifth embodiment of the present invention.

FIG. 11 illustrates a display screen for controlling a mobile terminal according to a fifth embodiment of the present invention.

As illustrated in FIG. 11-1, a list of messages may be displayed on the touchscreen 400. At least two of the messages, such as the first and second messages D-1 and E-1 are simultaneously touched and are then dragged left to right. In this example, the simultaneously touched messages may be adjacent to each other or may be located separate from each other.

As illustrated in FIG. 11-2, other messages related to the first and second messages D-1 and E-1, such as third and fourth messages D-2 and E-2 are displayed by replacing the first and second messages D-1 and E-1, respectively.

A method of controlling a mobile terminal according to a sixth embodiment of the present invention is explained with reference to FIG. 12 as follows.

Figure 12:
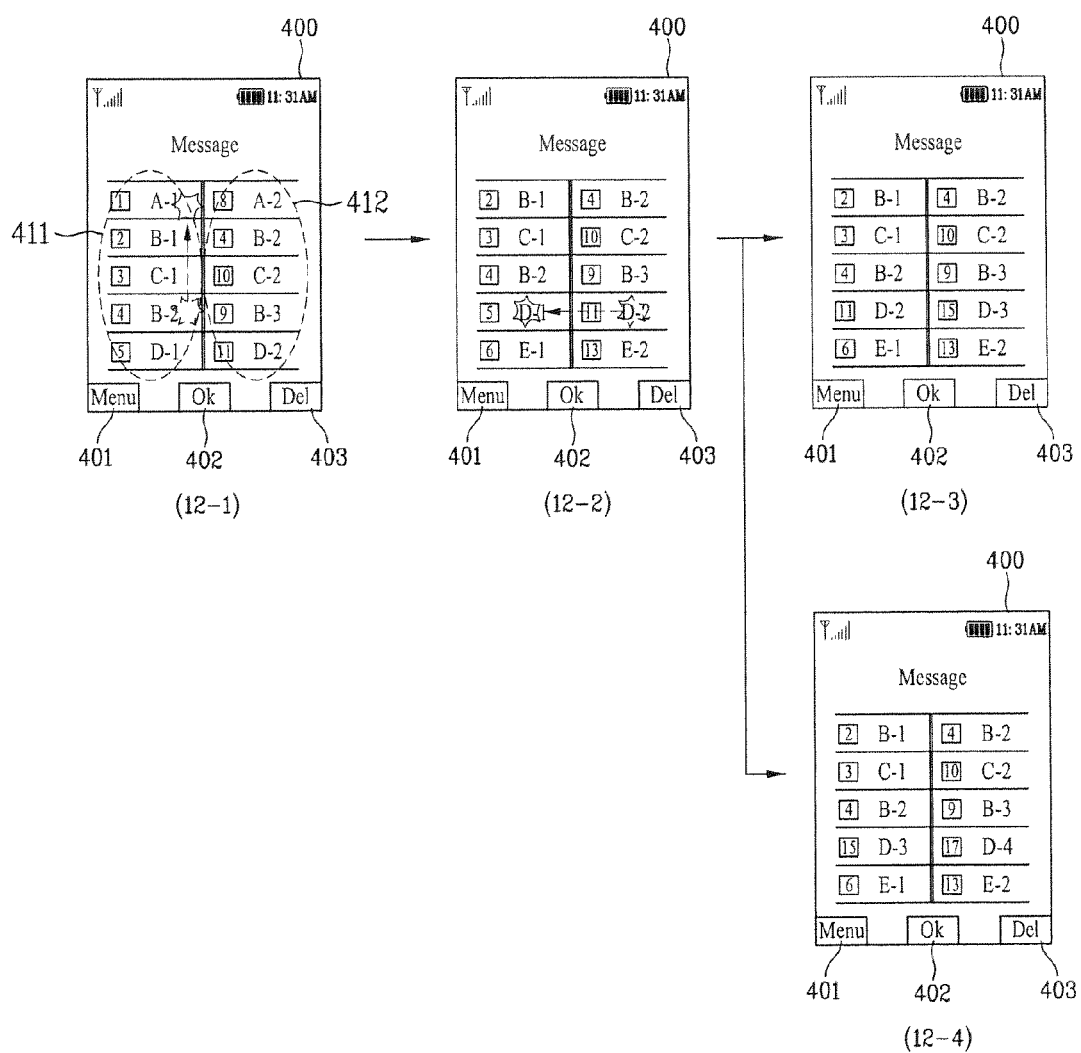
FIG. 12 illustrates a display screen for controlling a mobile terminal according to a sixth embodiment of the present invention.

FIG. 12 illustrates a display screen for controlling a mobile terminal according to a sixth embodiment of the present invention.

A list of messages may be displayed in two columns, such as a first column 411 and a second column 412 (FIG. 12-1). In this example, the first column 411 may be configured in the same form of the message list illustrated in FIG. 6-1.

Related messages are displayed adjacent to the messages of the first column 411. In this example, the related messages may be configured to populate the second column 412.

For example, a touch and drag may be performed on the touchscreen 400 from bottom to top. As illustrated in FIG. 12-1, the messages in the list are scrolled up bottom to top. In this example, the messages of the touched and dragged column may be configured to scroll up. Alternatively, the messages of the entire columns may be scrolled together (FIG. 12-2).

FIGS. 12-2 and 12-3 illustrate an example of a specific row touched on the touchscreen 400 and dragged right to left. As shown in FIG. 12-3, a second message D-2 is displayed instead of a first message D-1 of the specific row, while a third message D-3 is displayed instead of the second message D-2.

Alternatively, as illustrated in FIG. 12-4, a third message D-3 and a fourth message D-4 may be displayed by replacing the first and second messages D-1 and D-2 of the specific row, respectively.

A method of controlling a mobile terminal according to a seventh embodiment of the present invention is explained with reference to FIG. 13 as follows.

Figure 13:
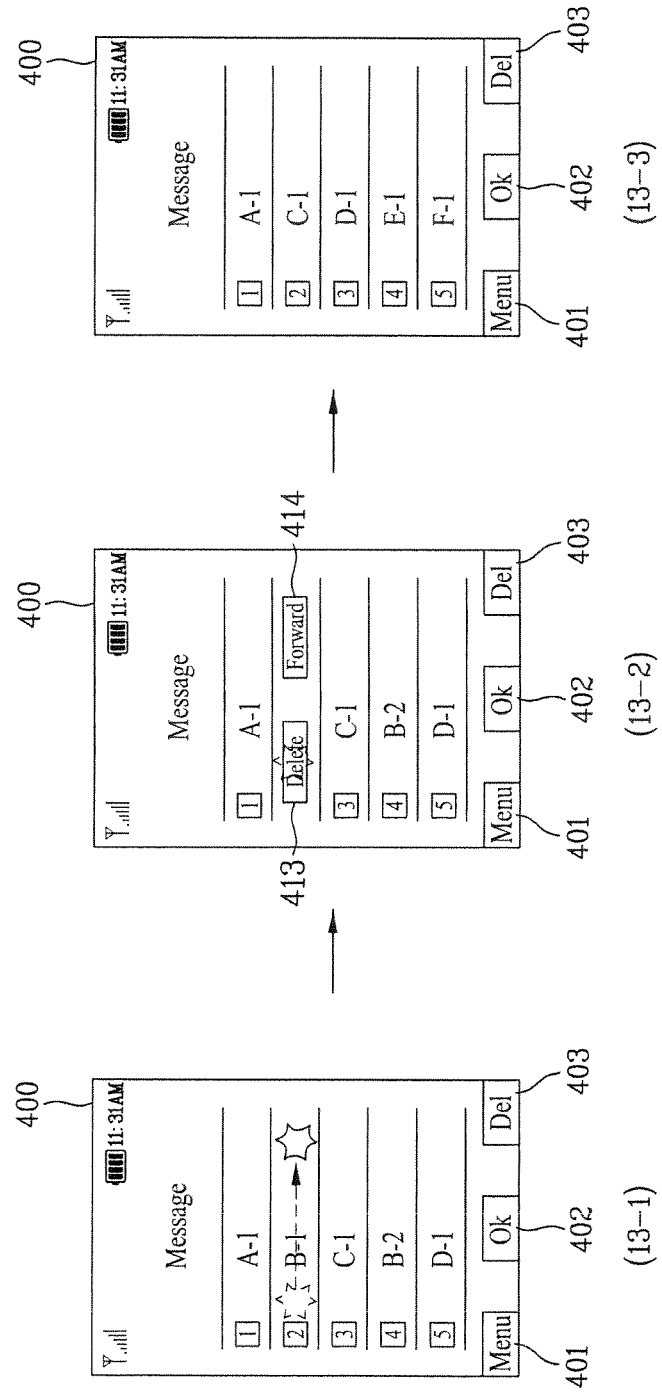
FIG. 13 illustrates a display screen for controlling a mobile terminal according to a seventh embodiment of the present invention.

FIG. 13 illustrates a display screen on which a method of controlling a mobile terminal according to a seventh embodiment of the present invention is implemented.

A list of messages is displayed on the touchscreen 400 (FIG. 13-1). A message B-1 is touched and dragged left to right. In this example, the message B-1 is the most recent message received from a party B. Thus, there are no new related messages since the specific message is the message that is most recently received from a correspondent party B.

In this example, as illustrated in FIG. 13-2, at least one menu or function applicable to all messages may be displayed. In this example, a 'delete' menu 413 and a 'forward' menu 414 may be displayed.

If the delete menu 413 is selected from the menus by being touched. All the messages received from the correspondent party B are collectively deleted (FIG. 13-3).

Alternatively, the delete menu 413 and the forward menu 414 may be configured to appear in a manner of repeatedly dragging the specific message B-1 right to left to display all related messages and then touching and dragging a last related message B-n right to left.

A method of controlling a mobile terminal according to an eighth embodiment of the present invention is explained with reference to FIG. 14 as follows.

Figure 14:
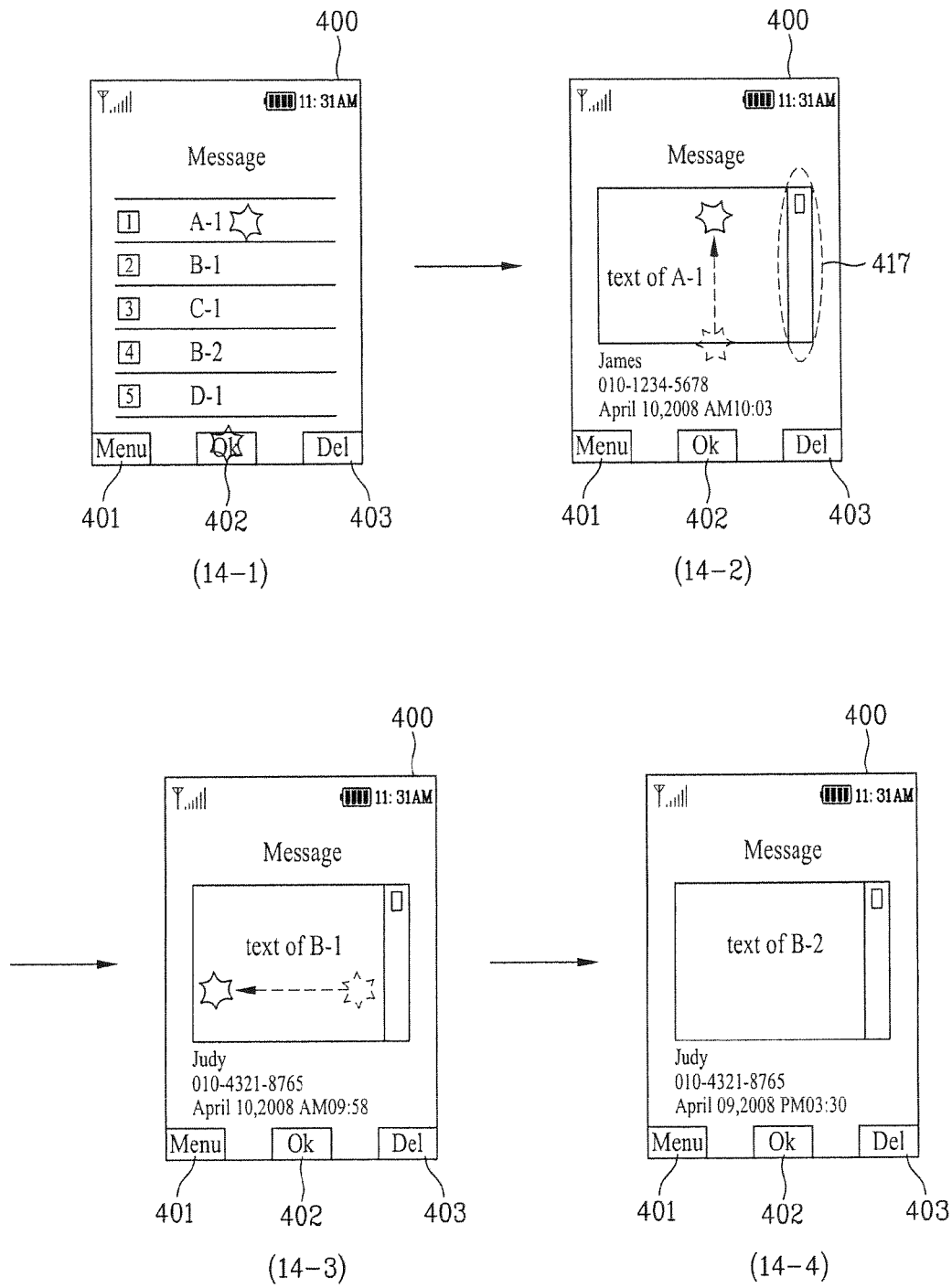
FIG. 14 illustrates a display screen for controlling a mobile terminal according to an eighth embodiment of the present invention.

FIG. 14 illustrates a display screen for controlling a mobile terminal according to an eighth embodiment of the present invention.

A list of messages is displayed on the touchscreen 400 (FIG. 14-1). In this example, a text of a message A-1 may be displayed.

For example, an 'OK' icon 402 on the touchscreen 400 is touched to display the text of the message A-1 after the message A-1 has been touched and selected.

As illustrated in FIG. 14-2, the text of the specific message A-1 is displayed on the touchscreen 400. A scroll bar 417 may be displayed if an entire content of the text cannot be fully displayed on the touchscreen 400. The content of the text may be viewed by touching and dragging the scroll bar 417.

FIG. 14-2 illustrates a touch and drag performed on the touchscreen 400 from a top to bottom direction. In this example, a text of a message B-1 may be displayed (FIG. 14-3).

Subsequently, as illustrated in FIG. 14-3, a touch and drag may be performed on the touchscreen 400 from a right to left direction. As such, a text of a message B-2 related to the message B-1 may be displayed (FIG. 14-4).

The above-explained embodiments are not exclusively applicable to the message list. In the following description, examples of applying the present invention to other implementations are explained.

A method of controlling a mobile terminal according to a ninth embodiment of the present invention is explained with reference to FIGS. 15 to 17 as follows.

Figure 15:
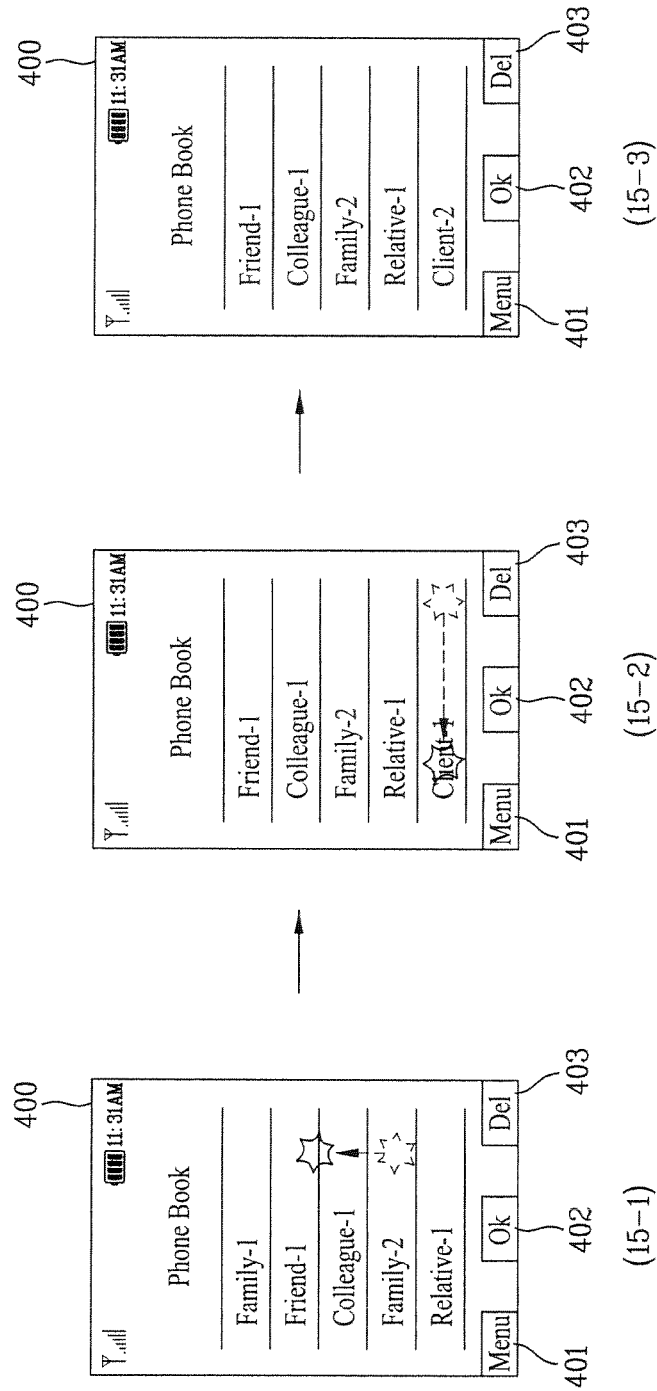
Figure 16:
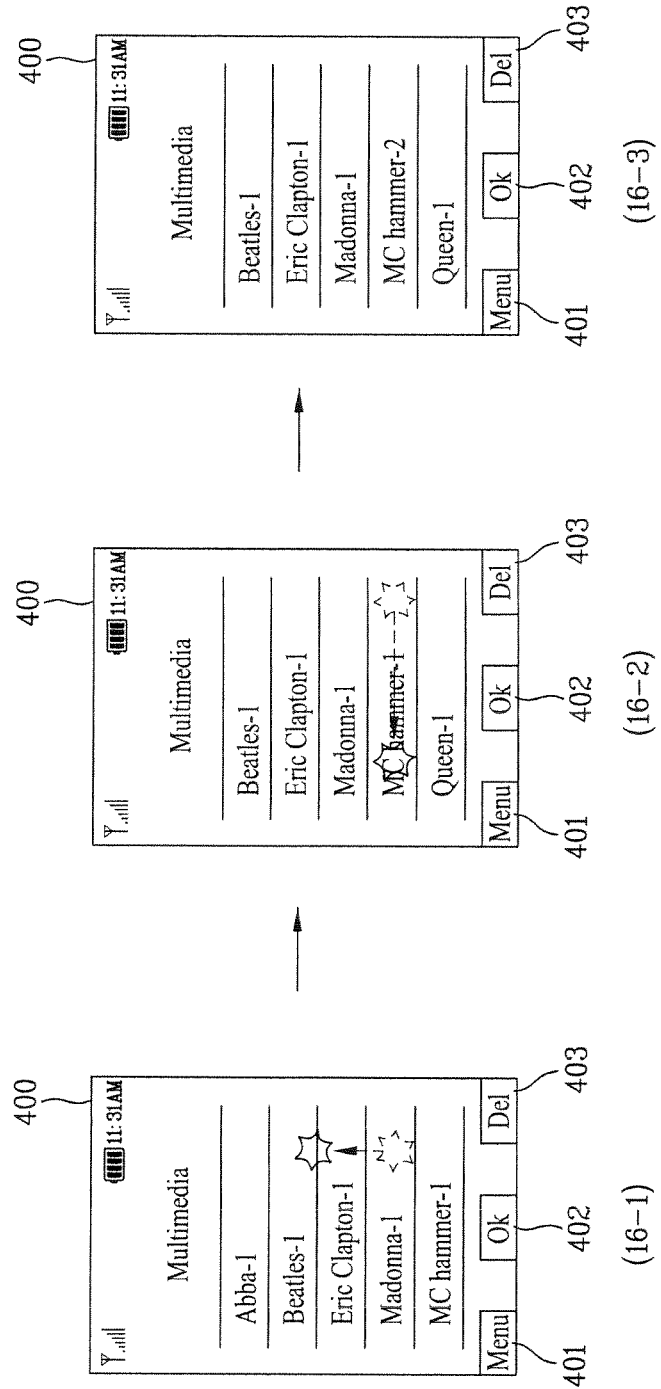

FIGS. 15 to 17 illustrate a display screen for controlling a mobile terminal according to a ninth embodiment of the present invention.

FIG. 15-1 illustrates an example of a list of correspondent parties of a phonebook displayed on the touchscreen 400. In this example, the correspondent parties may be sorted in a top-to-bottom direction in alphabetical order.

As illustrated in FIG. 15-1, a group, to which a corresponding party belongs, is indicated in each item of the list. In addition, a numeral added adjacent to the group is provided to distinguish a plurality of correspondent parties belonging to the same group.

In this example, a touch and drag is performed on the touchscreen 400 in a first direction, such as from bottom to top.

As illustrated in FIG. 15-2, the correspondent parties are scrolled up on the list from bottom to top to display following correspondent parties. A number of correspondent parties scrolled may be configured proportional to a length of the touch and drag.

Subsequently, a specific correspondent party Client-1 in the list is touched and then dragged in a second direction, such as right to left. The second direction is different from the first direction.

As illustrated in FIG. 15-3, the selected party Client-1 is replaced by another party Client-2. In this example, the appearing party Client-2 is the party related to the selected party Client-1. For example, the related party may be the party belonging to the same group of the selected party Client-1.

Alternatively, the selected party Client-1 may be touched and dragged in a direction opposite to the second direction, such as left to right. This is explained in the description for the first embodiment of the present invention, which is omitted for clarity of this disclosure in the following description.

The above-mentioned embodiments of the present invention may be applicable to a file in the following manner. This is explained with reference to FIG. 16 as follows.

In the following description, a multimedia file is assumed to be music file. However, it is understood that the present embodiment is applicable to various multimedia files, such as a moving picture file, a still picture file, or a flash picture.

FIG. 16-1 illustrates a list of music files displayed on the touchscreen 400. In this example, the music files may be sorted in a top-to-bottom direction in alphabetical order of singer names.

As illustrated in FIG. 16-1, a corresponding singer name of a music file is indicated in each item of the list. Additionally, a numeral added adjacent to the singer name is provided to distinguish a plurality of music files of the same singer.

In this example, a touch and drag may be performed on the touchscreen 400 in a first direction, such as from bottom to top.

As illustrated in FIG. 16-2, different music files may be displayed as the music files are scrolled up in the list from bottom to top. In this example, a number of the scrolled music files can be configured proportional to a length of the touch and drag.

Subsequently, a specific music file MC Hammer-1 in the list is touched and then dragged in a direction, such as from right to left. The second direction is different from the first direction.

As illustrated in FIG. 16-3, a second music file MC Hammer-2 replaces the selected music file MC Hammer-1. The appearing music file MC Hammer-2 is the music file related to the selected music file MC Hammer-1.

Alternatively, the music file MC Hammer-1 may be touched and then dragged in a direction, such as left-to-right, opposite to the second direction. This is explained in the description for the first embodiment of the present invention, which is omitted for clarity of this disclosure in the following description.

In one example, a search range of the related music file may vary according to a pattern of the touch and drag. For example, if the specific music file is dragged right to left a related music file stored within a terminal may appear. Additionally, if the specific music file is dragged left to right a related music file stored within an external server may appear via a wireless communication unit. Alternatively, if the specific music file is dragged by a predetermined pressure, speed, or distance a related music file stored within an external server may appear via a wireless communication unit. This is apparent to those skilled in the art without further explanation, of which details are omitted in the following description.

Furthermore, recently played multimedia file items may be displayed as the second list if one of the items of the first list is touched and dragged.

The above-mentioned embodiments of the present invention are applicable to a menu list. This is explained with reference to FIG. 17 as follows.

FIG. 17-1 illustrates a list of menus within the terminal 100 displayed on the touchscreen 400. As illustrated in FIG. 17-1, Menu 1 to Menu 5 of menus of items of the list may be indicated in each item of the list. In this example, a touch and drag may performed on the touchscreen 400 in a first direction, such as from bottom to top.

For example, the menus may be scrolled up on the list from bottom to top to display other menus (FIG. 17-2). A number of the scrolled menus can be configured proportional to a length of the touch and drag.

Subsequently, a specific Menu 5 of the menus of the list is touched and dragged in a second direction, such as right to left. The second direction is different from the first direction.

As illustrated in FIG. 17-3, a menu Menu 5-1 replaces the selected Menu 1. The appearing menu Menu 5-1 is the menu related to the selected menu Menu 5 The related menu such as the appearing menu Menu 5-1 may be a submenu of the selected menu Menu 5.

Subsequently, the menu Menu 5-1 is touched and then dragged in a second direction, such as right to left. The second direction is different from the first direction.

As illustrated in FIG. 17-4, menu Menu 5-2 replaces the Menu 5-1. The menu Menu 5-2 may be another submenu of the selected menu Menu 5.

FIG. 17 is intactly applicable to folders as well as the menus within the terminal. This is apparent to those skilled in the art without further explanation, of which details are omitted in the following description.

A method of controlling a mobile terminal according to a tenth embodiment of the present invention is explained with reference to FIG. 18 as follows.

FIG. 18 illustrates a display screen for a mobile terminal according to a tenth embodiment of the present invention.

A menu of messages is displayed on the touchscreen 400 in a first direction, such as a top-to-bottom direction (FIG. 18-1).

A boundary between the messages, as illustrated in FIG. 18-1, is touched and dragged in a second direction, such as right to left. The second direction is different from the first direction.

As illustrated in FIGS. 18-2 and 18-3, one menu list may replace the previous menu list. FIG. 18-2 illustrates an example of a phonebook list replacing a previously displayed list. By non-limiting examples it is understood that the newly displayed list is not limited to the phonebook list only.

Accordingly, the present invention provides the following effects and/or advantages.

First, a terminal user may select a specific menu or function if various menus and functions exist in a terminal. Second, the terminal user may input a prescribed command within the selected menu or function.

It will be apparent to those skilled in the art that various modifications and variations can be made in the present invention without departing from the spirit or scope of the inventions.

For example, it is understood that the touch and drag in the foregoing description may be replaced by a flicking action. Furthermore, the above-described methods may be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

Thus, it is intended that the present invention covers the modifications and variations of this invention provided they come within the scope of the appended claims and their equivalents.

What is claimed:

1. A terminal comprising:
an input unit for receiving an input;
a touchscreen for displaying a first list of items; and
a controller for:
controlling the touchscreen to scroll the first list of items in a first direction in response to a first input received via the input unit;
selecting a first item from the first list of items in response to a second input received via the input unit;
controlling the touchscreen to scroll the selected first item in a second direction that is perpendicular to the first direction in response to selecting the first item from the first list of items;
controlling the touchscreen to scroll a second list of items associated with the selected first item while the first list of items is displayed, as the selected first item is scrolled in the second direction;
selecting a second item from the second list of items which is next to the selected first item in a third direction which is opposite to the second direction as the second list of items are scrolled in the second direction; and
controlling the touchscreen to place the selected second item in a position previously occupied by the selected first item such that the second item is included in the first list of items,
wherein scrolling the selected first item in the second direction occurs simultaneously with placing the selected second item in the position previously occupied by the selected first item.

2. The terminal of claim 1, wherein the first direction is vertical and the second direction is horizontal.

3. The terminal of claim 1, wherein the first direction is horizontal and the second direction is vertical.

4. The terminal of claim 1, wherein the controller is further for controlling the touchscreen to display at least one item from the second list of items adjacent to the selected first item.

5. The terminal of claim 1, wherein the controller is further for controlling the touchscreen to place a third item selected from the second list of items in a position previously occupied by the selected second item such that the selected third item is included in the first list of items.

6. The terminal of claim 1, wherein the controller is further for:
controlling the touchscreen to scroll a plurality of items selected from the first list of items in the second direction; and
controlling the touchscreen to scroll a list associated with each of the selected plurality of items in the second direction.

7. The terminal of claim 1, wherein the controller is further for controlling the touchscreen to display a plurality of lists.

8. The terminal of claim 7, wherein the controller is further for controlling the touchscreen independently scroll each of the plurality of lists.

9. The terminal of claim 1, wherein the controller is further for controlling the touchscreen to display a menu associated with the second list when a final item of the second list of items is displayed as a result of scrolling the second list of items.

10. The terminal of claim 1, wherein the second list of items is distinct from the first list of items.

11. A method of controlling a scroll, the method comprising:
displaying, on a display unit, a first list of items;
scrolling the first list of items in a first direction in response to a first input received via an input unit;
selecting, in response to a second input received via the input unit, a first item from the first list of items;
scrolling, in response to selecting the first item from the first list of items, the selected first item in a second direction that is perpendicular to the first direction;
scrolling, on the display unit, a second list of items associated with the selected first item while the first list of items is displayed, as the selected first item is scrolled in the second direction;
selecting a second item from the second list of items which is next to the selected first item in a third direction which is opposite to the second direction as the second list of items are scrolled in the second direction; and
placing the selected second item in a position previously occupied by the selected first item such that the second item is included in the first list of items,
wherein scrolling the first list of items in the second direction occurs simultaneously with placing the second item selected from the second list of items in the position previously occupied by the selected first item.

12. The method of claim 11, wherein the first direction is vertical and the second direction is horizontal.

13. The method of claim 11, wherein the first direction is horizontal and the second direction is vertical.

14. The method of claim 11, further comprising displaying, on the display unit, at least one item from the second list of items adjacent to the selected first item.

15. The method of claim 11, further comprising placing a third item selected from the second list of items in a position previously occupied by the selected second item such that the selected third item is included in the first list of items.

16. The method of claim 11, further comprising:
selecting a plurality of items from the first list of items; and
scrolling a list associated with each of the selected plurality of items in the second direction.

17. The method of claim 11, further comprising displaying a plurality of lists on the display unit.

18. The method of claim 17, further comprising independently scrolling each of the plurality of lists.

19. The method of claim 11, further comprising displaying, on the display unit, a menu associated with the second list of items when a final item of the second list of items is displayed as a result of scrolling the second list of items.

20. The method of claim 11, wherein the second list of items is distinct from the first list of items.

* * * * *